United States Patent [19]

Heinrichs et al.

[11] Patent Number: 5,332,260

[45] Date of Patent: * Jul. 26, 1994

[54] TELESCOPICALLY LENGTH VARIABLE STEERING COLUMN ARRANGEMENT

[75] Inventors: Heinz-Josef Heinrichs, Koblenz-Metternich; Udo Wagner, Dachsenhausen; Reiner Wendling, Koblenz, all of Fed. Rep. of Germany

[73] Assignee: Stabilus GmbH, Koblenz-Neuendorf, Fed. Rep. of Germany

[*] Notice: The portion of the term of this patent subsequent to Dec. 10, 2008 has been disclaimed.

[21] Appl. No.: 988,035

[22] Filed: Dec. 8, 1992

Related U.S. Application Data

[60] Continuation of Ser. No. 791,031, Nov. 12, 1991, abandoned, which is a division of Ser. No. 576,368, Aug. 31, 1990, Pat. No. 5,071,163.

[30] Foreign Application Priority Data

Sep. 12, 1989 [DE] Fed. Rep. of Germany ....... 3930372

[51] Int. Cl.⁵ .......................... B62D 1/18; F16F 5/00; F16F 9/32
[52] U.S. Cl. .................................. 280/775; 280/777; 74/493; 188/300; 267/64.12
[58] Field of Search .................. 280/775, 777; 74/493; 267/64.12; 188/300

[56] References Cited

U.S. PATENT DOCUMENTS

| | | | |
|---|---|---|---|
| 1,623,493 | 4/1926 | Postlethwait | 74/493 |
| 2,549,345 | 4/1951 | Tamboli | 74/493 |
| 2,639,626 | 5/1953 | Snyder | 74/493 |
| 2,716,355 | 8/1955 | Schmid | 74/493 |
| 3,570,832 | 3/1971 | Ortheil | |
| 4,337,967 | 7/1982 | Yoshida | 280/777 |
| 4,516,440 | 5/1985 | Nishikawa | 74/493 |
| 4,662,616 | 5/1987 | Hennells | 267/64.28 |
| 4,709,790 | 12/1987 | Freitag et al. | 188/300 |
| 4,785,921 | 11/1988 | Hosan et al. | 188/300 |
| 4,993,522 | 2/1991 | Wagner | 188/269 |
| 5,071,163 | 12/1991 | Heinrichs | 280/775 |
| 5,113,716 | 5/1992 | Dumschat et al. | 74/493 |

FOREIGN PATENT DOCUMENTS

| | | |
|---|---|---|
| 676254 | 7/1952 | United Kingdom . |
| 1362899 | 8/1974 | United Kingdom ............... 280/777 |
| 317791 | 10/1988 | European Pat. Off. . |
| 0317791 | 5/1989 | European Pat. Off. ............ 280/777 |
| 1554258 | 5/1969 | Fed. Rep. of Germany . |
| 2417543 | 10/1975 | Fed. Rep. of Germany . |
| 2501752 | 7/1976 | Fed. Rep. of Germany . |
| 2908906 | 9/1980 | Fed. Rep. of Germany . |
| 3423161 | 1/1985 | Fed. Rep. of Germany . |
| 3536285 | 4/1987 | Fed. Rep. of Germany . |
| 8812673 | 1/1989 | Fed. Rep. of Germany . |
| 264894 | 5/1989 | Fed. Rep. of Germany . |
| 3740669 | 6/1989 | Fed. Rep. of Germany . |
| 3902882 | 8/1990 | Fed. Rep. of Germany . |
| 3935832 | 12/1990 | Fed. Rep. of Germany . |
| 3930372 | 3/1991 | Fed. Rep. of Germany . |
| 3739781 | 6/1991 | Fed. Rep. of Germany . |
| 381005 | 12/1991 | France . |
| 0166628 | 7/1988 | Japan ................................ 280/775 |
| WO8001478 | 7/1980 | PCT Int'l Appl. . |

Primary Examiner—Margaret A. Focarino
Assistant Examiner—Paul Dickson
Attorney, Agent, or Firm—Brumbaugh, Graves, Donohue & Raymond

[57] ABSTRACT

A steering column of a motor vehicle is composed of two telescopically and torque transmittingly interengaging steering column tubes. These tubes are mounted in bearings. A steering wheel is allocated to a first steering column tube. The other steering column tube is connected with a steering gear box. A cylinder piston device is provided within at least one of the two steering column tubes. This cylinder piston device can be locked in a plurality of positions, such as to define a plurality of variable lengths of the steering column.

41 Claims, 4 Drawing Sheets

TELESCOPICALLY LENGTH VARIABLE STEERING COLUMN ARRANGEMENT

This is a continuation of application Ser. No. 07/791,031, filed on Nov. 12, 1991, now abandoned, which was a division of application Ser. No. 07/576,368, filed on Aug. 31, 1990, now U.S. Pat. No. 5,071,163, issued Dec. 10, 1991.

BACKGROUND OF THE INVENTION

It is desirable to have telescopically length variable steering columns in motor vehicles for adapting the length of the steering column to the body size of the respective driver.

STATEMENT OF THE PRIOR ART

In the German Patent Application P 39 02 882.8 (published after Sep. 12, 1989), it was suggested to provide a hydraulically blockable gas spring as a positioning device for the length adjustment of a steering column in a motor vehicle.

OBJECT OF THE INVENTION

It is an object of the present invention to provide a length variable steering column with hydraulic locking means such that these hydraulic locking means are integrated into the steering column and that no lateral parts project beyond the steering column.

A further object of the present invention is to provide a steering column of adjustable length which can be easily manufactured with a minimum of costs.

A further object of the present invention is to provide a steering column which is adapted to transmit even high steering torques.

SUMMARY OF THE INVENTION

A telescopically length variable steering column arrangement for a motor vehicle has an axis and comprises at least two telescopically and torque transmittingly interengaging steering column elements. These steering column elements are rotatably mounted in a bearing system of the body work of the motor vehicle. A steering wheel is allocated to a first one of said steering column elements for common rotation therewith, and connection means are allocated to a second one of said steering column element for being connected with steering gear means. The steering gear means are provided for effecting the steering movement of the vehicle wheels. A fluid operated locking system is provided within at least one of said at least two steering column elements for locking the steering column elements in a plurality of selectable relative axial positions. The locking means comprise locking valve means and a locking control element operatively connected with the locking valve means.

With a steering column arrangement of the present invention, the majority of parts of the fluid operated locking system are housed within the steering column. There are no laterally projecting parts. The column has therefore a good appearance. No housing means are necessary for accommodating laterally projecting parts. There is no danger of injury in the event of an accident.

The steering column arrangement has a first end portion adjacent the steering wheel and a second end portion adjacent the steering gear means. The locking control element may be preferably located adjacent the first end of the steering column arrangement, and this means that the locking control element may be located in the central area of the steering wheel. If an actuating device of a signal horn is located in this central area of the steering wheel, it is easy to provide a transmission means extending from the central area of the steering wheel to an excentrically located control element.

According to a preferred embodiment, the fluid operated locking system comprises a cylinder having an axis and two ends and defining a cavity therein. A piston rod unit extends through at least one of the two ends. A piston unit is connected with the piston rod unit within the cavity and separates two working chambers within the cavity from each other. Passage means are provided for interconnecting the working chambers, and locking valve means are allocated to the passage means. Such a fluid operated locking system is readily available in the market, e.g. in form of gas spring and hydraulic locking units or hydropneumatic locking units.

When the fluid operated locking system is in the form of a cylinder piston device, the cylinder member may act as one of the steering column elements, and a tube member may be non-rotatably guided on the cylinder member and act as the other one of the steering column elements. In this case, the piston rod unit may be operatively connected with this tube member.

Due to the fact that the cylinder member fulfils the function of one of the telescopic steering column elements, a very compact steering column is obtained with a minimum of components.

The tube member may be operatively connected with the steering wheel, whereas the cylinder member is operatively connected with the steering gear means. In this case, the locking control element may be provided adjacent an end portion of the piston rod unit and adjacent the steering wheel. E.g., the piston rod unit may be provided with a hollow piston rod, and the locking control element may be provided at the outer end of this piston rod. Such, the movement of the locking control element on actuation thereof may be transmitted through the bore of the piston rod to the locking valve means which may be provided adjacent the piston unit.

Alternatively, the cylinder member may be operatively connected adjacent a bottom end thereof with a steering wheel. In this case, the tube member will be operatively connected with the steering gear means, and the locking control element may be provided adjacent the bottom end of the cylinder member.

When the cylinder member acts as one of the steering column elements, this cylinder member is provided with torque transmission means engaging complementary torque transmission means of the tube member. These torque transmission means may be shaped in the cylinder member itself. Alternatively, it is possible also that the cylinder member is surrounded by a torque transmitting sleeve non-rotatably connected with the cylinder member and that this torque transmitting sleeve is provided with torque transmission means engageable with complementary torque transmission means of the tube member.

The torque transmission means and the complementary torque transmission means may be provided by axially extending spline means which provide a low resistance against telescoping of the cylinder member and the tube member with respect to each other.

The complementary torque transmission means of the tube member may be provided by a torque transmission ring member fixed to an end portion of the tube member. This facilitates the manufacturing of the complementary torque transmission means and helps to lower the manufacturing costs.

Besides the possibility of using the cylinder member as one of the steering column elements, there exists also the possibility that the steering column elements are provided by two steering column tubes providing a hollow space therein. In this case, the cylinder member and the piston rod unit of the cylinder piston device may be housed within this hollow space and one of the steering column tubes may be operatively connected with the piston rod unit, whereas the other one of the steering column tubes is operatively connected with the cylinder member. In this case, the steering column tubes are provided with respective torque transmission means, and these torque transmission means may again be spline means.

The steering column elements may be rotatably mounted within an external bearing tube. Such an external bearing tube is of particular interest, if it is desired also to selectively vary the inclination of the steering column with respect to the body work of the motor vehicle.

Irrespective of the existence or non-existence of an external bearing tube, the first steering column element may be slidingly and rotatably mounted within a first bearing unit, whereas the second steering column element may be rotatably mounted and axially supported by a second bearing unit.

It is desirable that a telescopically length variable steering column is unlocked for a reduction of its axial length in case of an accident. This may be achieved in that the fluid operated locking system is provided with securing means unlocking the steering column elements in a respective position in response to a predetermined axial load. If the fluid operated locking system comprises at least two working chambers the respective volumes of which are variable in response to relative axial movement of the steering column elements, at least one of the working chambers may be provided with an escape opening. This escape opening may be provided with emergency closure means. These emergency closure means may be provided for opening under a predetermined axial load on the steering column elements.

The fluid operated locking means may be combined with biasing means biasing the steering column elements towards a terminal relative position such that the steering column elements move towards said terminal relative position in response to opening the locking valve means. E.g., it is possible that the steering column is under prestress such that on opening the locking valve means, the steering column is automatically adjusted to its maximum length. In this case, the driver who wants to lengthen the steering colum must only actuate the locking control element and wait for the automatic increase of length, until the desired length value is obtained. In this moment, the driver has to stop actuation of the locking control element. Alternatively, it is also possible to integrate the biasing means such that on releasing the locking system, the length of the steering column is automatically shortened.

The biasing means may comprise a volume of pressurized gas, such as it is known from gas springs and hydropneumatic locking elements.

The fluid operated locking system may comprise a volume of locking liquid in at least two working chambers separated from each other by said locking valve means.

The fluid operated locking system may also be used for a clamping movement of the steering column in case of an accident.

The various features of novelty which characterize the invention are pointed out with particularity in the claims annexed to and forming a part of the disclosure. For a better understanding of the invention, its operating advantages and specific objects attained by its use, reference should be had to the accompanying drawings and descriptive methods, in which there are illustrated and described preferred embodiments of the invention.

BRIEF DESCRIPTION OF THE DRAWINGS

The invention will be explained in greater detail hereinafter with reference to embodiments shown in the accompanying drawings in which.

DETAILED DESCRIPTION OF THE PREFERRED EMBODIMENTS

Figure 1:
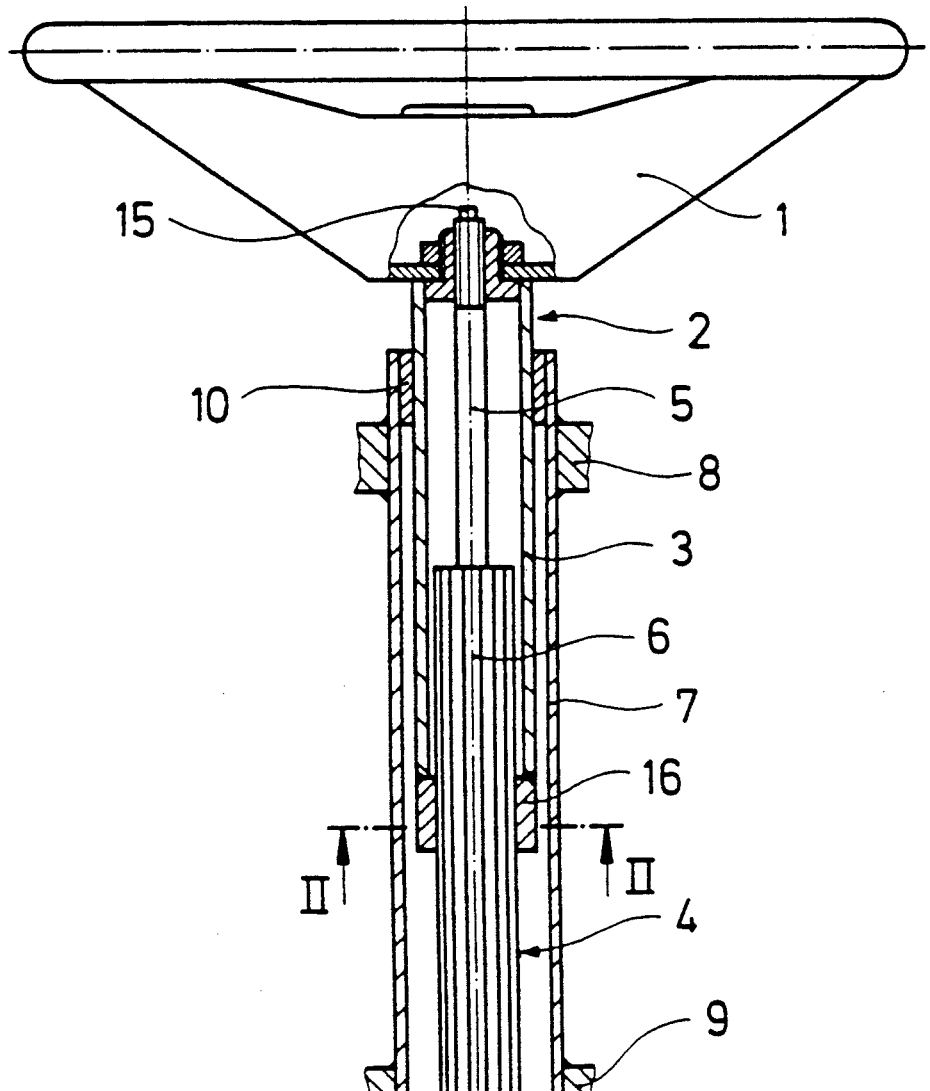
FIG. 1 shows a longitudinal section through a first embodiment of a steering column arrangement according to the present invention.
Figure 2:
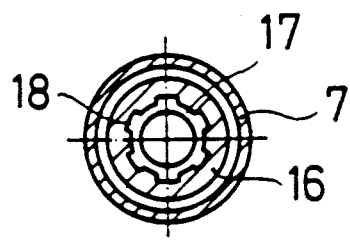
FIG. 2 shows a section according to line II—II of FIG. 1.

The steering column 2 shown in FIG. 1 comprises a tube member 3, which at its upper end is rigidly connected with a steering wheel 1. The steering column 2 further comprises a cylinder 6 of a hydropneumatic adjusting element 4. A piston rod 5 of this hydropneumatic adjusting element 4 is connected with the upper end of the tube member 3 in the area of the steering wheel 1. The cylinder 6 of the hydropneumatic adjusting element 4 is in telescopic engagement with the tube member 3 so that the tube member 3 is axially slidable with respect to the cylinder 6, and a steering torque can be transmitted from the steering wheel 1 through the tube member 3 to the cylinder 6. The length of the steering column 2 is variable by axially sliding the tube member 2 with respect to the cylinder member 6. A torque transmitting ring 16 is fixed to the lower end of the tube member 3. This torque transmitting ring 16 is provided with axially extending groove means 18 interengaging with complementary axially extending spline means 17 of the cylinder member 6. The spline means of the cylinder member 6 may either be directly shaped into the wall of the cylinder member or may be provided on a sleeve surrounding the cylinder 6 and fixed with respect to the cylinder both in axial and circumferential direction.

To accommodate the steering column 2, which consists of the tube member 3 and the cylinder member 6, an external tube 7 is provided which is fixed on parts 8 and 9 which are rigid with the body work of the motor vehicle. Alternatively, the external tube 7 may also be tiltable and fixable in various tilting positions with respect to the body work. A bearing bush 10 is fixed in the external tube 7 near the upper end thereof. In this bearing bush 10, the tube member 3 is axially slidable and rotatable. A further bearing 11 is provided at the lower end of the external tube 7 and is fixed in this external tube. A stud-like connection part 12 is connected with a bottom plate of the cylinder 6. This stud-like connection part is rotatably mounted and axially fixed by the lower bearing 11 within the stationary external tube 7. The axial fixation is obtained by a locking ring 14 engaging a groove 13 of the stud-like connection part 12. Thus, axial forces from the cylinder 6 are transmitted to the external tube 7 via the bearing 11.

The assembling of the steering column arrangement is very simple. One can enter the cylinder 6 together with the tube member 3 into the external tube 7 from the upper end thereof and thereafter fix the cylinder 6 within the bearing 11 by providing the locking ring 14. A push member 15 serves as a locking control element. This push member 15 is provided at the upper end of the hollow piston rod 5 and is located in the centre of the bearing wheel 1. This push member 15 serves to actuate a valve disposed within the hydropneumatic adjusting element 4. The push member 15 can e.g. be actuated via an actuating lever not shown in the drawings, since usually the actuating device for the signal horn is provided in the centre of the driving wheel 1.

In FIG. 1, the external tube 7 is supported by rigid parts 8 and 9 of the body work of the motor vehicle. It is easily understandable, however, that the external tube 7 could also be tiltably mounted within the body work of the motor vehicle so that the inclination of the steering column 2 could be adjusted according to the wishes of the driver.

Figure 3:
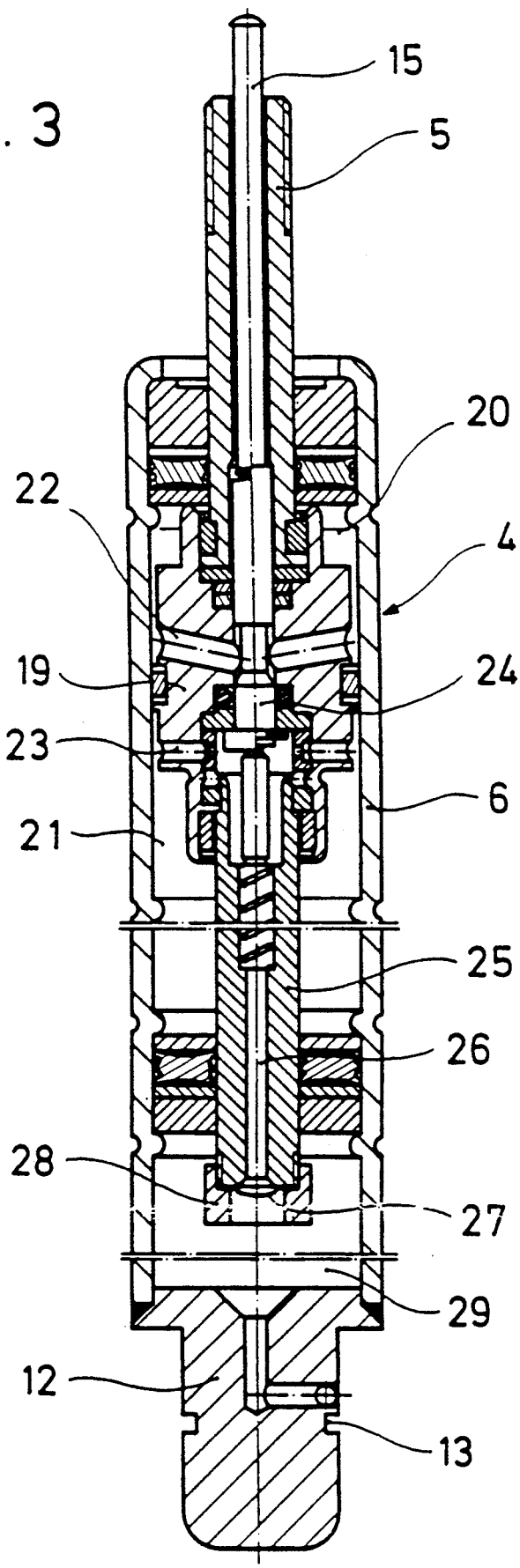
FIG. 3 shows a hydropneumatic cylinder piston device to be used as a fluid operated locking system for a steering column of the present invention.

FIG. 3 shows the adjusting element 4. The cylinder 6 is provided with longitudinal grooves or is surrounded by a sleeve which is axially and circumferentially fixed with respect to the cylinder 6, and in this case the sleeve could be provided with longitudinal grooves. At the upper end of the cylinder 6, there is provided a guiding and sealing unit for the piston rod 5. The cavity within the cylinder 6 comprises a liquid filled space, which is subdivided into two working chambers 20 and 21 by a piston 19. The piston 19 is connected to the piston rod 5. A passage 22 opens into the upper working chamber 20. This passage is provided within the piston 19. A further passage 23 is allocated to the lower working chamber 21. By means of a valve member 24 which can be actuated by the push member 15, the two passages 22 and 23 can be interconnected, such as to provide a connection between the working chambers 20 and 21. In the position of the valve member 24 shown in the drawing of FIG. 3, the adjusting element 4 is hydraulically locked, since the closed valve does not permit any communication between the passage 22 and 23. Furthermore, there is at the bottom end of the piston 19 a piston rod extension 25 which passes through a partition defining a lower chamber 29. The piston rod extension 25 enters into the pressure chamber 29 below the partition. The piston rod extension 25 is provided with a longitudinal bore 26 at the end of which a rupture disc 27 is secured by means of a fixing nut 28. The chamber 29 is filled with a pressurized gas.

As the cross-sectional area of the piston rod 5 and the cross-sectional area of the piston rod extension 25 are equal to each other, the volume within the chambers 20 and 21 is independent of the axial position of the piston rod 5 with respect to the cylinder 6. The pressurized gas within the chamber 29 exerts a biasing force onto the piston rod extension 25 and the piston rod 5 in upward direction. This means that the steering wheel is biased towards the driver body and can be pushed inwards against the biasing force, when the valve member 24 has been brought into opening position.

The pressurized gas within the chamber 29 can be avoided. E.g., one can provide an opening from the chamber 29 to atmosphere. In this case, no biasing force is acting onto the extension 25 and the piston rod 5. The opening could be made, however, with a very small cross-sectional area so that on inward movement of the piston rod 5 with respect to the cylinder 6 a damping effect is obtained.

The rupture disc 27 mounted at the lower end of the bore 26 is so designed that with effect from a predetermined pressure difference between the working chamber 21 and the chamber 29 this disc breaks so overcoming the locking effect of the adjusting element. This means that under high axial forces, the steering column collapses axially and helps to absorb energy in the case of an accident.

Normal adjustment takes place in that via an actuating lever the push member 15 is pushed downwards, and thus the valve member 24 is also pushed downwards. Thus, a connection is made between the upper working chamber 20 and the lower working chamber 21. Then the steering column 2 can be varied in its length, until the desired position of the steering wheel is reached. When the actuating lever is released, the spring force of a spring causes the valve member 24 to be pushed backwards into the position shown in the drawings so that the adjusted position of the steering wheel is fixed. Due to the axial fixing of the cylinder 6 within the external tube 7 by means of the bearing 11 and the ring member 14, the axial position of the cylinder 6 and the connecting part 12 fastened thereto are in variable position. During adjustment, there is only a relative movement between the tube member 3 and the cylinder 6 of the hydropneumatic adjusting element 4, and the steering torque can always be transmitted because the tube member 3 is in torque transmitting engagement with the cylinder 6. The connecting part 12 is in connection with a steering gear driving the wheels for steering movement.

In FIG. 4, there is again shown an external tube 107, which is fixed on parts 108 and 109 of the body work. A steering column 102 is accommodated within the external tube 107.

Figure 4:
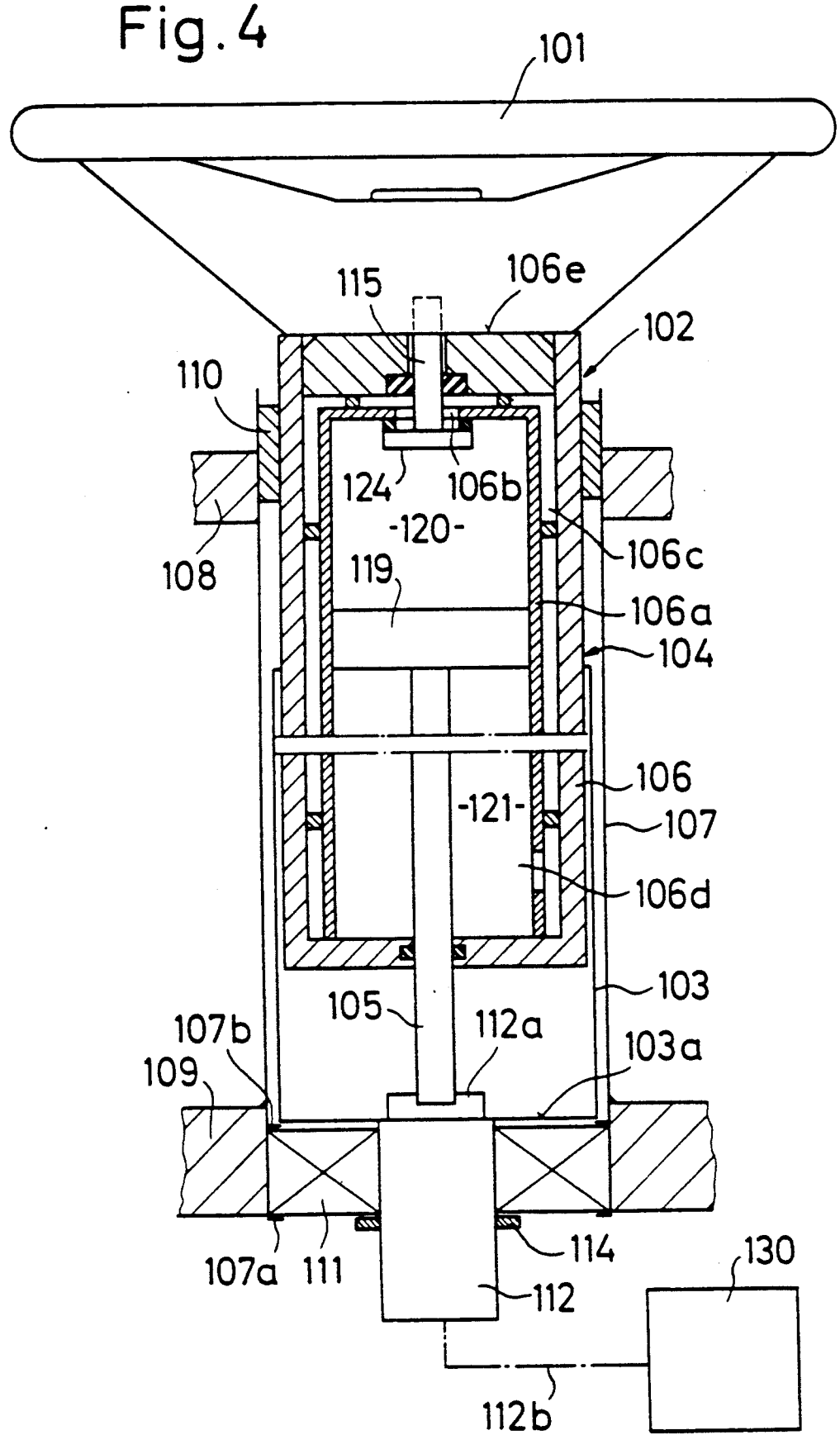
FIG. 4 shows a diagrammatic sectional view of a second embodiment of a steering column arrangement and FIG. 5 shows a diagrammatic sectional view of a third embodiment of a steering column arrangement of the present invention.

The steering column 102 comprises a gas spring 104. The gas spring 104 comprises a cylinder 106 and a piston rod 105. The piston rod 105 is combined with a piston 119. The piston 119 divides the cavity within the cylinder 106 into two working chambers 120 and 121. The working chambers 120 and 121 are housed within an inner casing 106a. The working chambers 120 and 121 are interconnectable by a passage 106b,106c,106d. This passage is provided with a locking valve member 124. The locking valve member 124 is biased towards the closing position as shown in FIG. 4 by the pressurized gas contained within the working chambers 120 and 121. The locking valve member 124 can be shifted into an open position by axial pressure exerted onto a push member 115. The steering wheel 101 is fastened to the upper portion or bottom portion of the cylinder 106. The cylinder 106 is rotatably and axially movably mounted by a bearing unit 110 within the external tube 107. The cylinder 106 is combined with a tube member 103. The tube member 103 is in telescopic engagement with the cylinder 106, and further the tube member 103 is in torque transmitting engagement with the cylinder 106 by spline means (not shown).

The tube member 103 is provided with a bottom part 103a. This bottom part 103a is provided with a stud-like connecting part 112 which is rotatably mounted within the external tube 107 by a lower bearing unit 111. The lower bearing unit 111 is fixed with respect to the external tube 107 by axial abutments 107a and 107b. The stud-like connecting part 112 is axially fixed with respect to the bearing unit 111 by the bottom wall 103a on the one hand and a releasable fastening ring 114 on the other hand. The piston rod 105 is axially supported by the stud-like connecting part 112 in the support socket 112a. The lower end of the stud-like connecting part 112 is connected by connection means 112b with a steering gear 130. The working chambers 120 and 121 are filled with pressurized gas. The pressurized gas biases the cylinder 106 upwards with respect to the piston rod 105. When the locking valve member 124 is brought to the opened position by actuating the push member 115, the cylinder 106 moves upwards together with the steering wheel 101. Rotation of the steering wheel 101 is transmitted to the tube member 103 and from the tube member 103 to the stud-like connecting part 112.

Alternatively, the working chambers 121 and 122 could also be filled with a liquid. In this case, it would be necessary to provide a piston rod extension extending through the upper end of the cylinder 106 as shown in FIG. 3. The valve member 124 could in such case be shifted to an excentric position.

The steering column is in the embodiment of FIG. 4 established by the cylinder 106 and by the tube member 103 which form telescopically and torque transmittingly engaging steering column elements.

Figure 5:
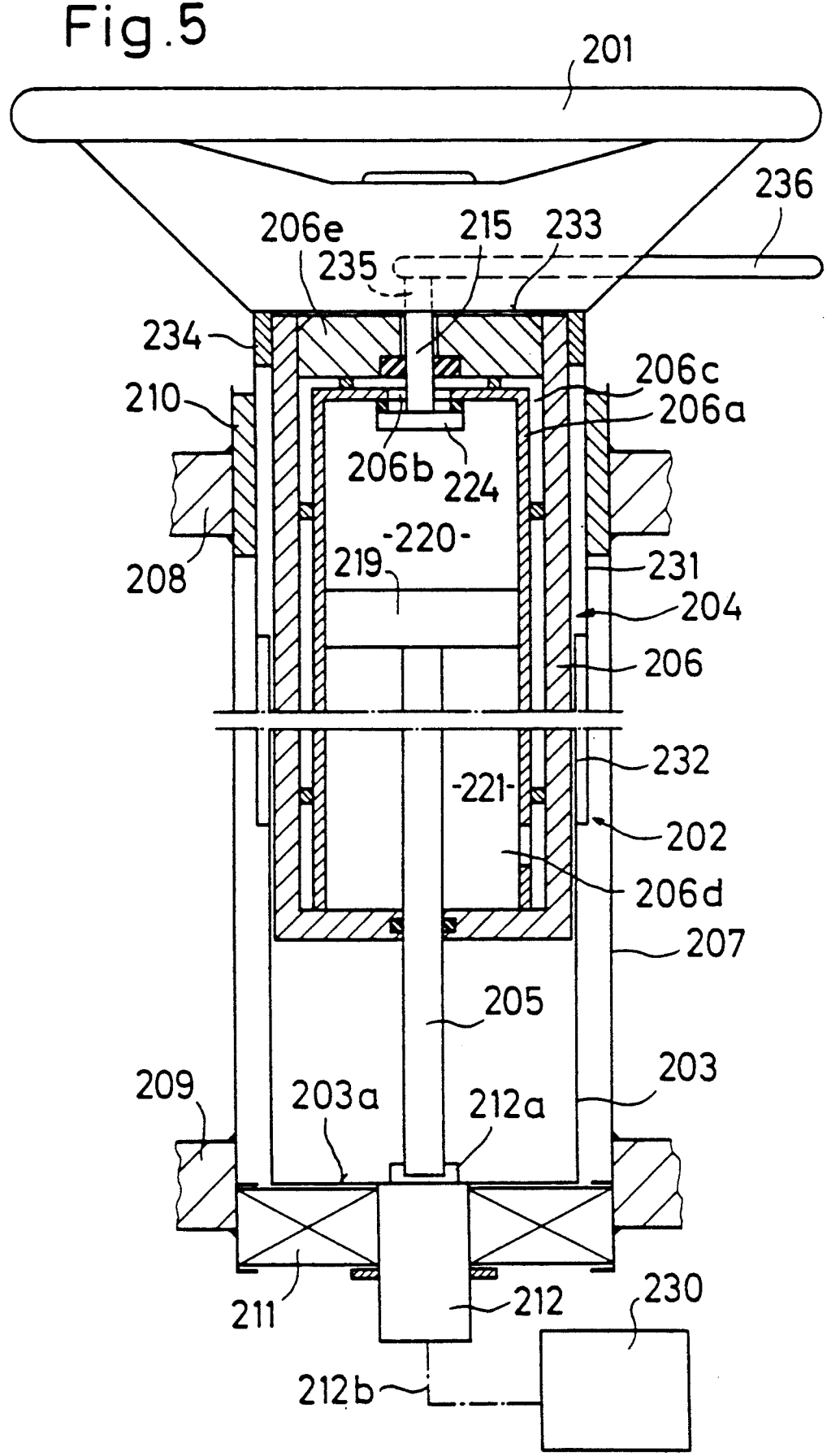

In the embodiment of FIG. 5, the gas spring 204 is substantially identic with the gas spring 104 of the embodiment of FIG. 4. Analogous parts are designated by the same reference numberal as in FIG. 4 increased by 100.

In the embodiment of FIG. 5, the steering column 202 is established by a lower tube member 203 and an upper tube member 231. The upper tube member 231 is telescopically and torque transmittingly engaged with the lower tube member 203 by axially extending spline means 232. The upper end of the upper tube member 231 is provided with an end wall 233. The upper end wall 206e of the cylinder member 206 engages the upper end wall 233 of the upper tube member 231. An adapter member 234 centres the upper end of the cylinder member 206 within the upper tube member 231. The push member 215 extends through an opening 235 of the upper end wall 233. The steering wheel 201 is fastened to the upper tube member 231. An actuating lever 236 is pivotally mounted on the steering wheel 201 and acts onto the push member 215. The steering column 202 is established in this embodiment by the telescopically and torque transmittingly engaging tube members 203 and 231.

While specific embodiments of the invention have been shown and described in detail to illustrate the application of the inventive principles, it will be understood that the invention will be embodied otherwise without departing from such principles.

The reference numerals in the claims are only used for facilitating the understanding and are by no means restrictive.

We claim:

1. A telescopically length variable steering column arrangement for a motor vehicle having an axis and comprising:

at least two telescopically and torque transmittingly interengaging steering column elements rotatably mounted in a bearing system;

a steering wheel allocated to a first one of said steering column elements for connection through a second one of said steering column elements with steering control means;

fluid locking means provided within at least one of said at least two steering column elements for locking said steering column elements in a plurality of selectable relative axial positions;

locking valve means operatively coupled to said fluid locking means for selectively locking and unlocking said fluid locking means;

locking control means operatively coupled to said locking valve means and accessible to the vehicle operator for controlling said locking valve means; and fluid release means coupled to said fluid locking means for unlocking said steering column elements in a respectively relative position thereof in response to a predetermined axial load.

2. A steering column arrangement as set forth in claim 1 further comprising biasing means for axially moving said steering column elements towards a terminal relative position when said locking valve means is open.

3. A steering column arrangement as set forth in claim 1 wherein said locking control means includes a locking control element extending outwardly of said first one of said steering column elements at a location adjacent to the steering wheel.

4. A steering column arrangement as set forth in claim 1 wherein:

said fluid locking means comprises a cylinder member having an axis and two ends and defining a cavity therein, a piston rod unit extending through at lest one of said two ends, a piston unit connected with said piston rod unit within said cavity and defining a working chamber of variable volume within said cavity; and said locking valve means is operatively coupled to said working chamber to control fluid flow relative thereto.

5. A steering column arrangement as set forth in claim 4 wherein:

said cylinder member comprises one of said steering column elements;

a tube member is non-rotatably guided on said cylinder member and comprises the other one of said steering column elements; and said piston rod unit is operatively connected to said tube member.

6. A steering column arrangement as set forth in claim 1 wherein:

said fluid locking means comprises a cylinder member having an axis and two ends and defining a cavity therein, a piston rod unit extending through at least one of said two ends, and a piston unit connected with said piston rod unit within said cavity; and said steering column elements comprise two steering column tubes providing a hollow space therein, said cylinder member and said piston rod unit being housed within said hollow space, one of said steering column tubes being operatively connected to said piston rod unit and the other one of said steering column tubes being operatively connected to said cylinder member.

7. A telescopically length variable steering column arrangement for a motor vehicle having an axis and comprising:
   at least two telescopically and torque transmittingly interengaging steering column elements rotatably mounted in a bearing system;
   a steering wheel allocated to a first one of said steering column elements for connection through a second one of said steering column elements with steering control means;
   fluid locking means provided within at least one of said at least two steering column elements for locking said steering column elements in a plurality of selectable relative axial positions;
   locking valve means operatively coupled to said fluid locking means for selectively locking and unlocking said fluid locking means;
   locking control means operatively coupled to said locking valve means and accessible to the vehicle operator for controlling said locking valve means; and
   means biasing said steering column elements towards a terminal relative position, said steering column elements being axially moved towards said terminal relative position by said biasing means upon the opening of said locking valve means.

8. A telescopically length variable steering column arrangement for a motor vehicle having an axis and comprising:
   at least two telescopically and torque-transmittingly interengaging steering column elements rotatably mounted in a bearing system;
   a steering wheel (1) allocated to a first one of said steering column elements for connection through a second one of said steering column elements with steering control means;
   fluid locking means provided within at least one of said at least two steering column elements for locking said steering column elements in a plurality of selectable relative axial positions;
   locking valve means (22, 23, 24) operatively coupled to said fluid locking means for selectively locking and unlocking said fluid locking means; and
   locking control means operatively coupled to said locking valve means and accessible to the vehicle operator for controlling said locking valve means.

9. A steering column arrangement as set forth in claim 1, 7 or 8, said fluid locking means comprising a liquid-filled locking chamber (21) connected with said locking valve means (22, 23, 24) and locking said steering column elements with respect to each other against axial movement in a direction corresponding to shortening said telescopically length variable steering column arrangement.

10. A steering column arrangement as set forth in claim 9, said locking chamber (21) being connectable by said locking valve means (22, 23, 24) with a liquid-filled further chamber (20).

11. A steering column arrangement as set forth in claim 10, said locking chamber (21) and said further chamber (20) having variable volumes, the volume of said locking chamber (21) being reducible and the volume of said further chamber (20) being increasable in response to a relative movement of said steering column elements in a direction corresponding to shortening said steering column arrangement, the volume of said locking chamber (21) being increasable and the volume of said further chamber (20) being reducible in response to an axial movement of said steering column elements in a direction corresponding to increasing the axial length of said steering column arrangement.

12. A steering column arrangement as set forth in claim 11, said locking chamber (21) and said further chamber (20) being within a cylinder (6) having axially opposite chamber-confining end walls, a first end wall adjacent said locking chamber (21) and a second end wall adjacent said further chamber (20), said locking chamber (21) and said further chamber (20) being separated from each other by a piston unit (19) axially movable within said cylinder (6) between said first and second chamber-confining end walls, said locking valve means (22, 23, 24) comprising a liquid passage (22, 23) extending between said locking chamber (21) and said further chamber (20), said piston unit (19) being connected with a piston rod member (5) which extends axially movably through said second chamber-confining end wall, an axial extension (25) of said piston unit (19) extending through said first chamber-confining end wall, said piston rod member (5) and said extension (25) having substantially equal cross-sectional areas, said piston rod member (5) and said cylinder (6) being locked with respect to each other when said locking valve means (22, 23, 24) is in a closed condition, and unlocked with respect to each other when said locking valve means (22, 23, 24) is in an open condition, said cylinder (6) and said piston rod member (5) inhibiting length variation of said steering column arrangement when locked with respect to each other.

13. A steering column arrangement as set forth in claim 12, said locking valve means (22, 23, 24) being controllable by a control rod (15) extending through an axial bore of said piston rod member (5).

14. A steering column arrangement as set forth in claim 12, said extension (25) having an end portion exposed to a further space (29) confined within said cylinder (6).

15. A steering column arrangement as set forth in claim 14, further space (29) containing a pressurized gas.

16. A steering column arrangement as set forth in claim 14, said further space (29) being substantially pressureless.

17. A steering column arrangement as set forth in claim 14, said further space (29) being vented to atmosphere.

18. A steering column arrangement as set forth in claim 17, said further space (29) being vented to atmosphere through a throttling opening.

19. A steering column arrangement as set forth in claim 9, said locking chamber (21) being coupled to liquid release means permitting outflow of liquid from said locking chamber (21) in response to a predetermined axial load.

20. A steering column arrangement as set forth in claim 12, said extension (25) comprising liquid release means for outflow of liquid from said locking chamber (21) in response to a predetermined axial load.

21. A steering column arrangement as set forth in claim 9, rotatably mounted within a tube (7) which is stationary with respect to the body work of a motor vehicle.

22. A steering column arrangement as set forth in claim 21, having a stud-shaped connection part (12) adjacent an end thereof remote from said steering wheel (1), adapted for operative connection with said steering control means, and axially fixed with respect to said tube (7) by a releasable locking ring (14).

23. A steering column arrangement as set forth in claim 12, said chamber-confining end walls being substantially fixed with respect to said cylinder (6).

24. A telescopically length variable steering column arrangement for a motor vehicle, having a steering-column axis and comprising:
   at least two telescopically and torque-transmittingly interengaging steering column elements (3, 6) rotatably mounted in a bearing system (10, 11);
   a steering wheel (1) allocated to a first one (3) of the steering column elements (3, 6) for connection by a second one (6) of the steering column elements (3, 6) with steering control means;
   locking means for locking the steering column elements in selectable relative axial positions, comprising two chambers (20, 21) filled with a liquid, which have individual volumes which depend on the selected relative axial position of the steering column elements, and which have a substantially fixed combined volume;
   valve means (24) in a hydraulic passage (22, 23) between the chambers (20, 21), having open and closed positions, for transfer of liquid between the chambers (20, 21) in the open position and for hydraulic locking between the chambers (20, 21) in the closed position; and
   control means (15) operatively coupled to the valve means (24) and accessible to a vehicle operator for controlling the valve means (24).

25. The steering column unit of claim 24, wherein the two chambers (20, 21) are disposed within a cylinder piston unit (4) comprising a cylindrical tube member (6) having a tube-member axis and two ends and a piston unit (5, 19) axially movable with respect to the cylindrical tube member (6),
   the piston unit (5, 19) comprising a rod member (5) sealingly movable in axial direction through one of the two ends and a piston member (19) fixed to the rod member (5) and separating the two chambers (20, 21) from each other within the cylindrical tube member (6),
   a first one (20) of the two chambers (20, 21) being disposed axially between the one end and the piston member (19),
   a second one (21) of the chambers (20, 21) being disposed axially between the piston member (19) and a partition of the cylindrical tube member (6),
   the piston unit (5, 19) having an extension (25) on the side remote from the one end,
   the extension (25) having a diameter which is substantially equal to the diameter of the rod member (5), and the extension (25) sealingly extending through the partition and being axially movable with respect to the partition in response to axial movement of the piston unit (5, 19) with respect to the cylindrical tube member (6).

26. The steering column of claim 25, wherein the valve means (24) are disposed within the piston unit (5, 19), and the valve means (24) are accessible to the control means (15) through an axial bore of the rod member (5).

27. The steering column unit of claim 26, wherein the control means comprises a control rod (15) within the axial bore of the rod member (5).

28. The steering column unit of claim 25, wherein the cylindrical tube member (6) has a tube extension beyond the partition defining a further chamber (29).

29. The steering column of claim 28, wherein the further chamber (29) is substantially free of fluid pressure.

30. The steering column of claim 29 or 21, wherein the further chamber (29) is connected to the atmosphere.

31. The steering column of claim 28, wherein the tube extension has a free end with a support member (12) for transmission of an axial load acting onto the cylinder piston unit (4).

32. The steering column of claim 24 or 25, wherein the valve means (24) is biased toward the closed position by hydraulic pressure within one (21) of the chambers (20, 21) in response to an axial compressive load acting onto the steering column elements.

33. The steering column of claim 24 or 25, wherein the control means comprises an actuating lever.

34. The steering column of claim 27, wherein the control means comprises an actuating lever operationally connected with the control rod (15).

35. The steering column of claim 34, the actuating lever having an actuating force input end remote from the steering-column axis.

36. The steering column of claim 24 or 25, wherein at least one (21) of the chambers (20, 21) is provided with an emergency opening (27) permitting escape of liquid from the one chamber (21) upon liquid pressure reaching or exceeding a predetermined pressure in the one chamber (21).

37. The steering column of claim 24 or 25, wherein the locking means are disposed within at least one of the two steering column elements (3, 6).

38. The steering column of claim 28, 29 or 21 said tube extension being provided with a bottom wall adjacent said further chamber (29).

39. The steering column of claim 38, said bottom wall being provided with a support and centering member (12) adapted for being centered and axially fixed within a hole of a bearing unit (11).

40. The steering column of claim 28 or 21, said piston unit extension (25) being at its end within said further chamber (29) free of radial extension means which are radially adjacent to a radially inner surface of said further chamber (29).

41. A telescopically length variable steering column arrangement for a motor vehicle, having a steering-column axis and comprising;
   at least two telescopically and torque-transmittingly interengaging steering column elements (3, 6) rotatably mounted in a bearing system (10, 11);
   a steering wheel (1) allocated to a first one (3) of the steering column elements (3, 6) for connection by a second one (6) of the steering column elements (3, 6) with steering control means;
   locking means for locking the steering column elements in selectable relative axial positions, comprising two chambers (20, 21) filled with a liquid, which have individual volumes which depend on the selected relative axial position of the steering column elements, and which have a substantially fixed combined volume;
   the two chambers (20, 21) being disposed within a cylinder-piston unit (4) comprising a cylindrical tube member (6) having a tube-member axis and two ends and a piston unit (5, 19) axially movable with respect to the cylindrical tube member (6), the piston unit (5, 19) comprising a rod member (5) sealingly movable in axial direction through one of the two ends of the cylindrical tube member (6) and a piston member (19) fixed to the rod member (6) and separating the two chambers (20, 21) from each other within the cylindrical tube member (6), a first one (20) of the two chambers (20, 21) being disposed axially between the one end and the piston member (19), a second one (21) of the chambers (20, 21) being disposed axially between the piston member (19) and a partition of the cylindrical tube member (6), the piston unit (5, 19) having an extension (25) on the side remote from the one end, the extension (25) having a diameter which is substantially equal to the diameter of the rod member (5), and the extension (25) sealingly extending through the partition and being axially movable with respect to the partition in response to axial movement of the piston unit (5, 19) with respect to the cylindrical tube member (6), the cylindrical tube member (6) having a tube extension beyond the partition defining a further chamber (29), which further chamber (29) is substantially free of gas pressure;

valve means (24) in a hydraulic passage (22, 23) between the chambers (20, 21), having open and closed positions, for transfer of liquid between the chambers (20, 21) in the open position and for hydraulic locking between the chambers (20, 21) in the closed position; and control means (15) operatively coupled to the valve means (24) and accessible to a vehicle operator for controlling the valve means (24).

* * * * *

UNITED STATES PATENT AND TRADEMARK OFFICE
CERTIFICATE OF CORRECTION

PATENT NO. : 5,332,260

DATED : July 26, 1994

INVENTOR(S) : H.J. Heinrichs et al.

It is certified that error appears in the above-indentified patent and that said Letters Patent is hereby corrected as shown below:

Title page, 2nd col., delete the 3rd line under the heading "FOREIGN PATENT DOCUMENTS";

Col. 10, line 42, "further" should read -- said further --;

Col. 12, line 7, "21" should read -- 41 --;

Col. 12, line 36, "21" should read -- 41 --;

Col. 12, line 43, "21" should read -- 41 --.

Signed and Sealed this

First Day of November, 1994

Attest:

Attesting Officer

BRUCE LEHMAN

Commissioner of Patents and Trademarks